(12) United States Patent
Burma

(10) Patent No.: US 7,147,164 B1
(45) Date of Patent: Dec. 12, 2006

(54) CROSS DIRECTION WIRELESS ACTUATOR

(75) Inventor: Gary Burma, West Vancouver (CA)

(73) Assignee: Honeywell ASCA, Inc., Ontario (CA)

( * ) Notice: Subject to any disclaimer, the term of this patent is extended or adjusted under 35 U.S.C. 154(b) by 0 days.

(21) Appl. No.: 11/324,096

(22) Filed: Dec. 30, 2005

(51) Int. Cl.
*G06K 7/10* (2006.01)

(52) U.S. Cl. .................... 235/472.02; 700/129
(58) Field of Classification Search .......... 235/472.02; 700/129
See application file for complete search history.

(56) References Cited

U.S. PATENT DOCUMENTS

| | | | |
|---|---|---|---|
| 4,947,684 A * | 8/1990 | Balakrishnan | 73/159 |
| 5,022,966 A * | 6/1991 | Hu | 162/198 |
| 5,771,174 A | 6/1998 | Spinner et al. | |
| 6,094,604 A | 7/2000 | Bucher et al. | |
| 6,564,117 B1 * | 5/2003 | Chen et al. | 700/129 |
| 6,754,468 B1 * | 6/2004 | Sieben et al. | 455/41.2 |
| 6,807,510 B1 * | 10/2004 | Backstrom et al. | 702/150 |
| 2005/0075116 A1 * | 4/2005 | Laird et al. | 455/456.3 |

OTHER PUBLICATIONS

Gorinevsky, Dimitry et al.; "Identification Tool for Cross-Directional Processes," *IEEE Transaction on Control Systems Technology* (11):5, 2003., pp. 629-640.

* cited by examiner

*Primary Examiner*—Uyen-Chau N. Le
(74) *Attorney, Agent, or Firm*—Scully, Scott, Murphy & Presser PC; Anthony Miologos

(57) ABSTRACT

An intelligent wireless cross direction (CD) actuator includes a wireless radio transceiver, a controller and a memory section. The wireless radio transceiver is used for transmitting and receiving control and functional information to and from other intelligent wireless CD actuators. The controller is used for processing the received control and functional information and for outputting a control signal to an electrical or mechanical device based upon the received control and functional information. Control and functional information, the output signal, a unique communications identifier for each of the other intelligent wireless CD actuators, and its own unique communications identifier are stored in the memory section. Each actuator is assigned a unique identification. The unique identifier is used to route information to and from other intelligent wireless CD actuator. Each wireless CD actuator is capable of communication with all other intelligent wireless CD actuators within an actuator network.

7 Claims, 3 Drawing Sheets

CROSS DIRECTION WIRELESS ACTUATOR

BACKGROUND OF THE INVENTION

1. Field of Invention

This invention relates generally to industrial manufacture equipment and, more particularly, to a control system and method for controlling the properties of a sheet being manufactured by the industrial manufacture equipment using a wireless network of actuators capable of peer-to-peer communication.

2. Description of Related Art

Modern industrial manufacture equipment for the manufacture of sheet products, such as paper, uses a series of actuators distributed over the sheet being manufactured to adjust the various properties of the sheet, such as caliper, moisture content, etc. The actuators control properties over the length of the sheet in the direction the sheet is moving on the equipment (the machine direction (MD)) and also across the width of the sheet in the cross direction (CD). Various sensors or scanners are positioned at locations along the sheet under manufacture to scan properties of the sheet and collect data to establish a profile across the sheet with respect to a particular property. A remote device or supervisory controller processes the collected data and produces control information (control actions, setpoints, status, positions). This control information is fed back to the appropriate actuators to adjust the properties under their influence toward a desired goal.

Typically, cross direction profile control and machine direction control is performed by the supervisory computer and an independent, distributed set of regulatory controllers performing basic actuator regulation in accordance with instructions from the supervisory computer. Profiles and other measured values are sent to the supervisory computer, which generates setpoints and sends them to the various regulatory controllers, which are responsible for moving and maintaining the associated actuators at the desired supervisory setpoint.

However, there is little overall coordination of all the CD actuators controlling all the various property profiles such as weight, moisture, and caliper. In general, there is little or no coordination between MD properties and CD properties performed by the supervisory computer.

U.S. Pat. No. 6,094,604, assigned to Honeywell Measurex Devron Inc. describes a control system and method with a network of intelligent actuators in a sheet-making machine that communicates control information to each other and is connected to each other via a bus.

Furthermore, U.S. Pat. No. 5,771,174, assigned to Measurex Corporation describes LAN (local area network) to tie a series of actuators (across the paper machine width) together and to also permit communication with the supervisory or host control system. Each actuator has an electrical connection coupled to a controller with a network bus. Communications between the actuator controllers and a gateway, as well as peer-to-peer communications between adjacent actuator controllers, take place along the network bus. The bus is a six-wire bus distributing power to the actuator controller and communications to the actuator controllers and to the gateway. Physically, the bus consists of one unshielded twisted pair of wires. This bus consists of one or more free-topology channels with a maximum of 62 actuators communicating on one channel.

However, both of these systems use a bus or cable to facilitate communication in the network. This causes a significant manpower for installation, maintenance and troubleshooting. Additionally, there is a significant cost for the installation. Further, the networking routing would require significant overhead and/or a separate device dedicated to control the routing. Additionally, if bus malfunctions, the entire bus must be replaced.

Accordingly, there is a need to reduce the cost and simplify the maintenance for the actuator network.

BRIEF SUMMARY OF THE INVENTION

Applicant has developed a wireless cross-direction actuator and control system and method that overcomes the drawbacks of the prior art by eliminating a need for a physical communication cable to be attached and connected to each of the plurality of actuators in the network.

Accordingly, disclosed is an intelligent wireless cross direction (CD) actuator having a wireless radio transceiver, a controller and a memory section. The wireless radio transceiver is used for transmitting and receiving control and functional information to and from other intelligent wireless CD actuators. The controller is used for processing the received control and functional information and for outputting a control signal to an electrical or mechanical device based upon the received control and functional information. Control and functional information, the output signal, a unique communications identifier for each of the other intelligent wireless CD actuators, and its own unique communications identifier are stored in the memory section. Each intelligent wireless actuator is assigned a unique identification. The unique identifier is used to route information to and from other intelligent wireless CD actuators. Each wireless CD actuator is capable of communication with all other intelligent wireless CD actuators within an actuator network.

The memory section further includes a database of all of the other intelligent wireless CD actuators, within the actuator network, its corresponding unique communication identifier, and its corresponding position along a sheet of material.

The intelligent wireless actuator also includes a timer or a timing means that is set to a predetermined threshold value. The predetermined threshold value is based upon a time that the intelligent wireless CD actuator expects to receive control and functional information from neighboring intelligent wireless CD actuators. The timer is used as a warning device that can provide notice to other intelligent wireless actuators that a wireless transceiver has malfunctioned.

If the timing means expires without receiving control and functional information from at least one neighboring intelligent wireless CD actuator, the intelligent wireless CD actuator, corresponding to the expired timer or timing means, will broadcast a status inquiry to the at least one neighboring intelligent wireless CD actuator. If a response to the status inquiry is not received, subsequently, then the intelligent wireless CD actuator will transmit a communications error message to the other intelligent wireless CD actuators.

When the other intelligent wireless CD actuator(s) receives the error message, the other intelligent wireless CD actuator(s) determines a type of error, re-calculates its own operational parameters based upon the type of error, and compensates for the type of error. The intelligent wireless CD actuator will also determine its response based upon a relative location to the intelligent wireless CD actuator that malfunctioned.

Control and functional information in the actuator network is prioritized and routed based upon a location of an originating intelligent wireless CD actuator. Additionally, error messages are given a higher priority than other periodic control and status messages.

BRIEF DESCRIPTION OF THE DRAWINGS

These and other features, benefits and advantages of the present invention will become apparent by reference to the following text and figures, with like reference numbers referring to like elements across the views, wherein.

DETAILED DESCRIPTION OF THE INVENTION

Figure 1:
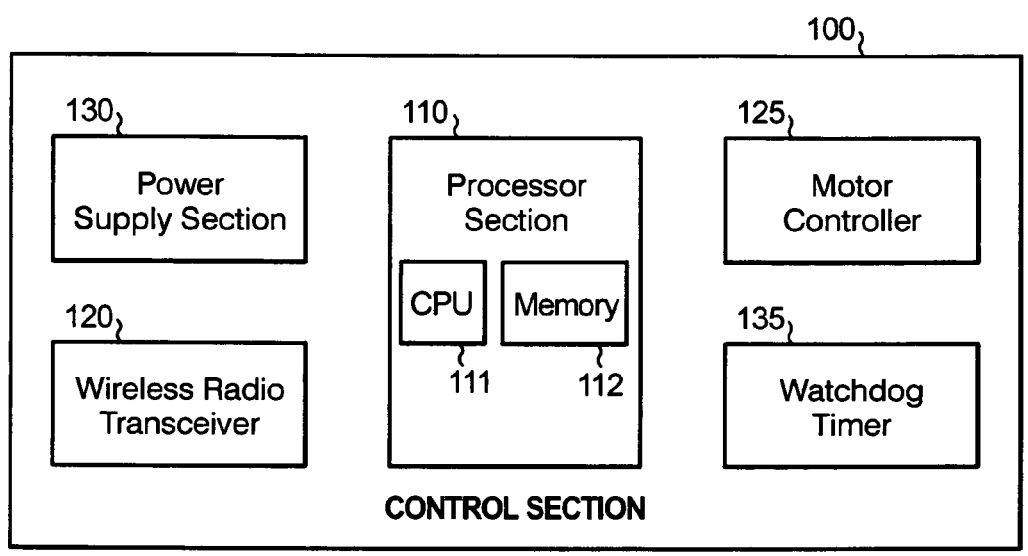
FIG. 1 illustrates a block diagram of control and transmission portions of a wireless actuator according to one embodiment of the present invention.

FIG. 1 is a block diagram of a wireless actuator cross direction (CD) 10 according to the invention and more particularly to the control section 100 of the wireless CD actuator 10. The control section 100 is located within a sealed enclosure for protection against the high humidity, moisture, and heat, as well as caustic chemicals and solvents typically found in a paper mill environment. The control section 100 is comprised of a processor section 110, a wireless radio transceiver 120, a motor controller 125, and a power supply section 130. The processor section 110 may include a CPU 111, and memory 112 containing the control algorithm. Alternatively, the wireless radio transceiver 120 is separate from the control section 100 and simply attached to the wireless CD actuator 10. The wireless radio transceiver 120 can be attached using any known attachment means. Furthermore, the wireless radio transceiver 120 can be embedded into the wireless CD actuator 10 to prevent the wireless communications transceiver 120 from interfering with the flow of the sheet material.

Communications to and from the wireless CD actuator(s) 10 are implemented by the wireless radio transceiver 120. In a preferred embodiment, the wireless radio transceiver 120 is an omni-directional wireless radio antenna. The antenna will have a preset radio coverage range. This radio coverage range will be determined by the location of the wireless actuator 10 and size of the industrial machine in which the wireless CD actuator 10 is located. The wireless CD actuator 10 must be able to transmit information to each of its closest neighboring wireless CD actuator(s) 10 in a near instantaneous time. Therefore, the radio coverage range must be long enough to coverage at least the neighboring wireless CD actuator(s) 10 for a single hop broadcast. Communication with non-neighboring wireless CD actuator(s) 10, i.e., an actuator not working in the same area, may be performed by a multi-hop broadcast. In other words, the communication can relay to a wireless actuator 10 to whom the communication is intended for, by other intermediary wireless actuator(s) 10. The wireless radio transceiver 120 will be able to uni-cast, multi-cast and broadcast messages.

The power supply section 130 may comprise a wired AC power supply, wired DC power supply or a fuel cell. The power supply section supplies power to the motor controller 125 and the wireless transceiver 120.

Each wireless CD actuator 10 is assigned a unique identification to route communication to and from the wireless CD actuator(s) 10. The unique identification can be any number that is used to distinguish the wireless CD actuator(s) 10, such as a sequence of the wireless CD actuator(s) 10 within the industrial machine. In another embodiment of the invention, the unique identification is an IP address.

One unique identification is assigned to each wireless actuator 10. The unique identification can be randomly assigned to the wireless CD actuator(s) 10 or assigned based upon the sequence within the industrial machine. For example, each wireless CD actuator 10 can include in the memory 112 of the processor section 110 a database of an available range for the IP address and assign itself one of the available IP addresses within the range.

Alternatively, the wireless CD actuator 10 can broadcast a request for an IP address to a central computer or server designated for assigning IP addresses. The central computer or server can be remotely located from the industrial machine provided that the central computer is within radio range of the wireless CD actuator 10. The central computer or server will assign an IP address based upon availability and will transmit the assigned IP address to the wireless CD actuator 10.

In another embodiment, the wireless CD actuator 10 can further include a dedicated button to trigger the assignment of the unique communications identification.

Figure 2:
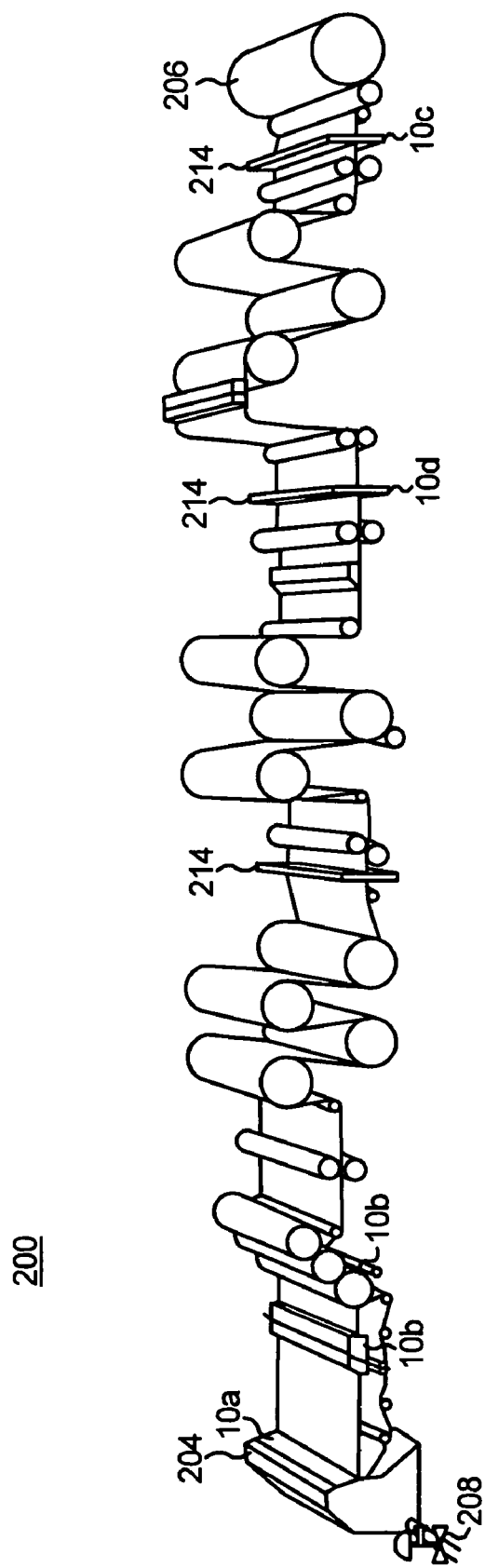
FIG. 2 illustrates an example of an industrial sheet making machine with the wireless CD actuators according to the present invention.

A plurality of wireless CD actuator(s) 10 are deployed or distributed over a sheet of material. These wireless CD actuator(s) 10 are individually controllable to vary a plurality of properties of the sheet material. FIG. 2 illustrates an example of an industrial sheet-making machine with the wireless CD actuator(s) 10 according to the present invention.

The paper making machine 200 is arranged as an assembly line that extends from a headbox 204 containing raw stock to a reel of finished paper product 206. In between the headbox 204 and the finished paper product 206, a series of rollers constrain the web of paper as it is manufactured and fed past various wireless CD actuator(s) 10 that control properties of the paper, e.g. weight and fibre orientation and dilution control, headbox actuator(s) 10a, moisture actuator(s) 10b, caliper actuator(s) 10c, and coat weight actuator(s) 10d. Other types of actuators can include weight actuators and dilution control actuators. The moisture actuator(s) 10b, at the paper machine wet end or in the dryer section, control the moisture content of the paper web. Caliper control actuator(s) 10c adjust the caliper or thickness of the paper web.

The paper-making machine 200 further includes machine direction actuators such as thick stock flow valves 208 and dryer steam flow. For example, at headbox 204, thick stock flow valve 208 controls the overall weight of the paper to be manufactured.

Also included in the assembly line are scanners 214 that measure and acquire data about the various properties of the paper web under manufacture. It will be understood that the particular actuators and scanners shown in FIG. 2 are for illustrative purposes only and any arrangement of actuators and scanners is dependent on the sheet of material to be manufactured.

The wireless CD actuator(s) 10 are in communication with each other via the wireless communications network created by a plurality of wireless CD actuator(s) 10. In another embodiment, the wireless CD actuator(s) 10 are also in communication with the scanners 214. The scanners measure properties from the sheet of material being manufactured and communicate the measured properties to the supervisory control system The wireless communications network is high speed, connecting together the wireless CD actuator(s) 10 for two-way, peer-to-peer communication between all wireless actuator(s) 10 in the network.

Figure 3:
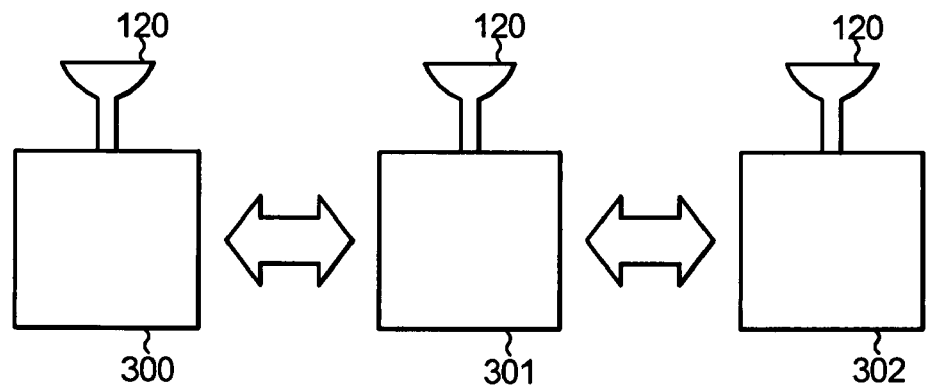
FIG. 3 illustrates three wireless CD actuators according to one embodiment of the invention.

FIG. 3 illustrates three wireless CD actuators according to an embodiment of the invention. It will be understood that the particular number of actuators shown in FIG. 3 are for illustrative purposes only and any number of wireless CD actuator(s) 10 can be used and is dependent on the sheet of material to be manufactured. As depicted in FIG. 3 there are three wireless CD actuators, 300, 301 and 302, where 300 is actuator 1, 301 is actuator 2, and 302 is actuator 3. Each actuator 300–302 has the identical control structure as depicted in FIG. 1 and, therefore, the control structure is not depicted in FIG. 3, except for the wireless radio transceiver. In one embodiment, the wireless CD actuators 300–302 are labeled in order to identify the specific actuator. Typically, each CD actuator set consists of about 30 to 200 actuators.

Each of the three wireless CD actuators, 300–302 will periodically, broadcast control and functional information or a message to the other wireless CD actuators, e.g. 301. The message will include a destination for the message, a time of the broadcast, the control parameters, actuator position or output level, and a status of the sending actuator. Optionally, the message might include the time of the next control and status message.

Upon receipt of the message, each receiving wireless CD actuator, e.g. 300 and 302, will store the received control parameters in its memory 112 and its processor section 110 will re-calculate various operational parameters based upon the received control information. For example, wireless actuator 301 will broadcast a message to wireless actuators 300 and 302 using its wireless radio transceiver. Wireless actuators 300 and 302 will receive the message via its own wireless radio transceiver 120 and re-calculate the operational parameters.

Each wireless actuator 300–302 will continuously monitor its own performance, using the processor section 110 and broadcast a status alarm if the wireless CD actuator is not operating as directed. This status alarm can be transmitted to a specific wireless CD actuator or to a group of wireless actuators or to all of the wireless CD actuators within the wireless communication network.

Additionally, each wireless actuator 300–302 will periodically monitor the performance of the other wireless actuators. Specifically, each wireless actuator 300–302 has a watchdog timer 135 or a timing means. The watchdog timer 135 is set to a predetermined time. This predetermined time is determined based upon the expected time that the next control and status message should be received. This time can be obtained directly from a prior control and status message. Alternatively, there is a default time that can be used. The default time is selected by a machine operator and can be based upon a sensitivity or tolerance of the machine. The watchdog timer 135 is reset upon receipt of a message. The watchdog timer 135 is a tool that is used to determine if any of the actuators' wireless transceivers 120 malfunction.

When the watchdog timer 135 expires, the wireless actuator, for example actuator 301, will broadcast a status inquiry to each other wireless actuator 300 and 302 whom the wireless actuator 301 expected to receive a control and status message. If a response is not received by the wireless actuator 301 from each of the other wireless actuator, i.e., 300 and 302, then the wireless actuator 301 will determine that the wireless radio transceiver 120 has malfunctioned. The wireless actuator 301 will then broadcast to all of the other wireless actuators, in the communication network, a message indicating that a wireless radio transceiver 120 has malfunctioned. The message will include the time of the broadcast, the identification, and the location of the wireless actuator that corresponds to the wireless radio transceiver 120 that malfunctioned. Additionally, in another embodiment, the wireless actuator 301 will also broadcast the message to an external host computer.

Additionally, each wireless actuator 300–302 is capable of compensating for a failure of another actuator. For example, if wireless actuator 301 has a malfunction, wireless actuators 300 and 302 can compensate their operating parameter to account for the error of the wireless actuator 301. Specifically, wireless actuator 301 will broadcast an error message to its neighboring wireless actuators 300 and 302. The error message will include the time of broadcast, the nature of the error, and its expected functional parameters.

Wireless actuators 300 and 302 will receive the error message from wireless actuator 301, via their wireless radio transceiver 120. Based upon the received error message and type of error, the processor section 110 for wireless actuators 300 and 302 will re-calculate its own operational parameters to compensate for the error. For example, if an error message indicates that wireless actuator 301 is moving slower than expected, wireless actuator 300 and 302 will compensate for this error by increasing its speed. Additionally, each wireless actuators 300 and 302 will broadcast a message that includes the change in its operational parameters and that the change was caused by the error in the wireless actuator 301.

Optionally, wireless actuators 300 and 302 can transmit a message to wireless actuator 301 to instruct the control section 100 of the wireless actuator 301 to shut down the wireless actuator 301 until the wireless actuator 301 is fixed.

As stated above, FIG. 3 illustrates only three neighboring wireless actuators 300–302; however, any number of wireless CD actuators can be used. When there are more than three wireless actuators, the messages are routed based upon a priority. This priority is based upon the location of the originating wireless CD actuator 10. This priority becomes important when a plurality of messages is relayed, i.e., multi-hop transmission, through a plurality of intermediary wireless CD actuator(s) 10, in the actuator network. For example, a direct message between neighboring wireless actuators can have a higher communication priority for the radio communication channel than a message that is being relayed through a plurality of intermediary wireless CD actuators from the originating wireless CD actuator to a receiving wireless CD actuator. This priority is based upon the fact that a neighboring wireless CD actuator 10 has a greater effect on the local parameters than a distant wireless CD actuator 10, and, thus, the urgency of the message is higher.

While the invention has been described such that a wireless CD actuator 10 can communicate with other wireless CD actuator(s) 10, using the wireless radio transceiver 10, it is within the scope of the invention that each wireless CD actuator 10 can communicate with other devices outside the peer-to-peer actuator network that are created by a plurality of wireless CD actuators 10. For example, the wireless CD actuators can communicate with an external host computer and a plurality of scanners 214.

The above description and drawings are given to illustrate and provide examples of various aspects of the invention, and is not intended to limit the invention to the examples or illustrations. Given the benefit of the above disclosure, those skilled in the art may be able to devise various modifications and alternate constructions that, although differing from the examples disclosed herein, nevertheless enjoy the benefits of the invention and fall within the scope of the invention.

The invention claimed is:

1. An intelligent wireless cross direction (CD) actuator comprising:
    a wireless radio transceiver for transmitting and receiving control and functional information to and from other intelligent wireless CD actuators;
    a control means for processing said received control and functional information and for outputting a control signal to an electrical or mechanical device based upon said received control and functional information; and
    a memory section for storing said control and functional information, the output signal, a unique communications identifier for each of said other intelligent wireless CD actuators, and said intelligent wireless CD actuator's own unique communications identifier, said unique identifier is used to route information to at least one other intelligent wireless CD actuator, said wireless CD actuator is configured for communication with all other intelligent wireless CD actuators within an actuator network.

2. The intelligent wireless CD actuator of claim 1, wherein said wireless radio transceiver is configured for uni-casting, multicasting and broadcasting information.

3. The intelligent wireless CD actuator of claim 1, wherein said control and functional information is routed based upon a location of an originating intelligent wireless CD actuator.

4. The intelligent wireless CD actuator of claim 1, wherein said memory section further includes a database of all of the other intelligent wireless CD actuators, within the actuator network, said intelligent wireless CD actuator's corresponding unique communication identifier and said intelligent wireless CD actuator's corresponding position along a sheet of material.

5. The intelligent wireless CD actuator of claim 4, further comprising:
    a timing means that is set to a predetermined threshold value, said predetermined threshold value is based upon a time that said intelligent wireless CD actuator expects to receive said control and functional information from neighboring intelligent wireless CD actuators, when said timing means expires without receiving said control and functional information from at least one neighboring intelligent wireless CD actuator, said intelligent wireless CD actuator will broadcast a status inquiry to the at least one neighboring intelligent wireless CD actuator, and if a response to said status inquiry is not received, said intelligent wireless CD actuator will transmit a communications error message to said other intelligent wireless CD actuators.

6. The intelligent wireless CD actuator of claim 4, wherein at least one intelligent wireless CD actuator broadcasts an error message to at least one other intelligent wireless CD actuator, said at least one other wireless CD actuator receives the error message, determines a type of error, re-calculates its said intelligent wireless CD actuator's own operational parameters based upon the type of error, and compensates for the type of error, said at least one other wireless CD actuator is determined by a relative location to the at least one wireless CD actuator.

7. The intelligent wireless CD actuator of claim 6, wherein said error message is given a higher priority for a communication channel than other periodic control and status messages.

* * * * *